United States Patent [19]

Downing et al.

[11] 4,240,840
[45] Dec. 23, 1980

[54] CEMENTITIOUS COMPOSITIONS

[75] Inventors: Stephen B. Downing, High Wycombe; Desmond W. J. Osmond, Windsor; Maurice W. Skinner, Maidenhead; Edmund J. West; David G. Dawson, both of High Wycombe, all of England

[73] Assignee: Imperial Chemical Industries Limited, London, England

[21] Appl. No.: 900,309

[22] Filed: Apr. 26, 1978

Related U.S. Application Data

[63] Continuation-in-part of Ser. No. 871,516, Jan. 23, 1978, abandoned, which is a continuation of Ser. No. 736,350, Oct. 27, 1976, Pat. No. 4,070,199.

[30] Foreign Application Priority Data

Oct. 28, 1975 [GB] United Kingdom ............... 44369/75
Apr. 27, 1977 [GB] United Kingdom ............... 17565/77

[51] Int. Cl.³ ............................................. C04B 7/353
[52] U.S. Cl. ....................................... 106/93; 106/99; 260/29.65; 260/42.13

[58] Field of Search ............................ 106/93, 99, 90; 260/29.65, 42.13

[56] References Cited

U.S. PATENT DOCUMENTS

| 3,030,258 | 4/1962 | Wagner | 106/93 |
|---|---|---|---|
| 3,169,877 | 2/1965 | Bartoli | 106/93 |
| 3,215,549 | 11/1965 | Ericson | 106/93 |
| 3,483,007 | 12/1969 | Hook | 106/93 |
| 3,716,386 | 2/1973 | Kempster | 106/93 |
| 3,788,869 | 1/1974 | Batdorf et al. | 106/93 |
| 3,824,107 | 7/1974 | Weiant | 106/93 |
| 4,070,199 | 1/1978 | Downing et al. | 106/93 |

*Primary Examiner*—James Poer
*Attorney, Agent, or Firm*—Cushman, Darby & Cushman

[57] ABSTRACT

Cementitious compositions having a modulus of rupture greater than 20 MN/m² are prepared by subjecting a mixture of hydraulic cement, fine aggregate, a selected water-dispersible polymer and water to a homogenization process (in order to very substantially reduce voidage in the product) and by thereafter curing and drying the product. The aggregate improves the modulus of rupture and resists any loss in this strength property due to moisture uptake and loss.

18 Claims, No Drawings

CEMENTITIOUS COMPOSITIONS

This application is a continuation-in-part of Ser. No. 871,516, now abandoned, filed Jan. 23, 1978, which is itself a continuation of Ser. No. 736,350, filed Oct. 27, 1976, now U.S. Pat. No. 4,070,199.

In our application Ser. No. 736,350, filed Oct. 27, 1976, the disclosure of which is hereby incorporated by reference, we describe and claim a homogeneous uncured cementitious composition which comprises the ingredients:

(a) a hydraulic cement selected from the group consisting of cements which comprise compounds of calcium, aluminum, silicon, oxygen and/or sulfur which set and harden by reaction with water, (b) water, and (c) a water-dispersible polymer (as therein defined), wherein (i) the ratio of water to hydraulic cement is in the range 15–18 parts by weight of water to 100 parts by weight of hydraulic cement;

(ii) the water-dispersible polymer is selected with reference to the hydraulic cement and to the selected proportions of water and cement for its suitability to facilitate a homogenisation process of dispersion and homogenization so that ingredients (a), (b) and (c) are regularly dispersed throughout the composition and to yield on homogenisation a product which can be shaped under pressure and which is shape-retaining;

(iii) the ratio of water-dispersible polymer to hydraulic cement is in the range 0.1–3.0 parts by weight of water-dispersible polymer to 100 parts by weight of hydraulic cement.

The ingredients (a), (b) and (c) are jointly subjected to a homogenisation process and, optionally, are shaped, such that on curing and drying, the homogeneous uncured composition yields a cured, dried and optionally shaped cementitious material having a modulus of rupture greater than 15 MN/m$^2$.

Preferably the cured and dried cementitious composition has a modulus of rupture greater than 20 MN/m$^2$ and more preferably the cured and dried cementitious composition has a modulus of rupture greater than 30 MN/m$^2$.

We have also described methods of producing the homogeneous uncured cementitious composition as defined above, methods of producing cured and dried compositions of high strength, and shaped articles which comprise a cured and dried cementitious composition as described above.

The cured and dried compositions described in our earlier patent application have a modulus of rupture which is significantly greater than that which can be expected for a cured and dried paste prepared by conventional procedures.

We believe, but without limitation, that the remarkably high modulus of rupture of the matrix of the novel cured homogeneous cementitious compositions described in our earlier patent application is due, inter alia, to the regular dispersion throughout the matrix of the selected ingredients hydraulic cement, water and water-soluble polymer by an efficient homogenisation process (or processes) which comprises high shear mixing, for example extrusion and/or calendering process(es). We also believe that it is essential to the production of a cured and dried high strength matrix, of which a cured composition is comprised, that regard is paid to the following factors in the preparation of the matrix. (a) the selection of a suitable water-dispersible polymer; (b) the use of a very low water/cement ratio having regard to the presence of other ingredients and always 0.28 or less; (c) the production of a homogeneous regularly-dispersed mixture of the ingredients, for example by an extrusion or calendering process; (d) the curing and drying of the composition under optimum conditions for the production of high strength cements.

The use of aggregate in prior cementitious compositions is known to be advantageous in certain respects (and depending upon the aggregate used), for example;

(1) to reduce the amount of hydraulic cement used and thus reduce the cost of the composition;

(2) to modify certain properties of the final composition by replacing a proportion of the composition by materials which are for example harder, softer, stiffer or more resistant to compression;

(3) to minimise shrinkage effects by accommodating shrinkage stresses; and (4) to react with the hydraulic cement.

It is well known that the addition of certain aggregates improves the compressive strength of cement but in general aggregates have a degrading effect on the modulus of rupture.

In the manufacture of asbestos-cement it is known to incorporate with the mixture of asbestos and cement, additionally silica, silicious material and other "fillers" generally. In U.S. Pat. No. 3,219,467, for example, which relates to the manufacture of asbestos-cement products by plastic-forming certain uncured mixtures comprising hydraulic cement, water, a "hydromodifier," asbestos and an optional auxiliary cementing agent if the product is to be steam cured, the auxiliary cementing agent may, and usually does, comprise silica flour or another silicious material. There is no indication that such material has any beneficial effect on the flexural strength of the cured product, whether the product has been steam cured or not. Moreover, other types of aggregate (which term is hereinafter intended to include materials containing silica or equivalent materials and other fillers referred to in U.S. Pat. No. 3,219,467 as "fillers" such as "stone flour, ground shale, kaolin, perlite and similar aggregates"), are stated to give final products of lower density and decreased strength. U.S. Pat. No. 3,219,467 recommends that such materials are not used where final structures of the highest strength are required. Asbestos is stated to be an essential component of the compositions.

We have been surprised to find, therefore, that there is an increase in the already high modulus of rupture of the cured and dried matrix of the cementitious compositions of the type described in our earlier patent application when the uncured cementitious compositions described therein, and which are subsequently cured and dried, comprise certain fine aggregates. Preferably these compositions of even higher strength are substantially free from inorganic mineral fibre, notably asbestos fibre. If present at all, there should not be present more than 1% by weight of asbestos or similar fibre based on the combined weight of all the ingredients. Preferably asbestos fibre is absent and in view of the hazard to health presented by this fibre the compositions of our invention are believed to be particularly useful. Steam curing is not necessary for the production of these high strength compositions.

Thus, according to one aspect of this invention we provide a homogeneous uncured cementitious composition which comprises the following initial ingredients:
(a) a hydraulic cement as herein defined;
(b) water;
(c) a water-dispersible polymer as herein defined, and
(d) a fine aggregate of which 75% by weight passes a sieve of aperture 1 mm.
wherein
(i) the ratio of water to hydraulic cement is in the range 10–28 parts by weight of water to 100 parts hydraulic cement;
(ii) the water-dispersible polymer is selected with reference to the hydraulic cement and to the selected proportions of water, cement and fine aggregate for its suitability to facilitate homogenisation as hereinbefore defined and to yield on homogenisation a product which can be shaped under pressure and which is shape-retaining;
(iii) the ratio of water-dispersible polymer to hydraulic cement is in the range 0.1–3.0 parts by weight of water-dispersible polymer to 100 parts by weight of hydraulic cement,
and wherein the ingredients (a), (b), (c) and (d) have been jointly subjected to a homogenisation process as herein defined and, optionally, have been shaped, such that on curing and drying, the homogeneous uncured composition yields a cured, dried and, optionally, shaped cementitious material having a modulus of rupture greater than 20 $MN/m^2$.

Preferably 100% by weight of the fine aggregate which is used passes a sieve of aperture 1 mm and such a sieve is equivalent to a British Standard No. 16 sieve or an ASTM No. 18 sieve. Fine aggregate which passes these sieves will usually have a mean particle diameter of rather less than 1 mm. However, the characterisation of the maximum size of fine aggregate to be used in the invention is readily carried out by sieve analysis (see "Properties of Concrete" by A. M. Neville, 2nd (metric) edition 1973, Pitman Publishing, London; this book refers also the relationship between the sieve aperture and the B.S. and ASTM sieves), and this is preferred to the determination of mean particle diameter. The preferred minimum useful size of aggregate is such that the major proportion, i.e. greater than 50% by weight, of the aggregate has a particle diameter of greater than 1 $\mu$m, for example as measured experimentally by a Coulter counter, and more preferably greater than 90% by weight.

Particularly preferred broad groups of fine aggregate are silica-containing materials, magnesium silicate-containing materials and alumina-containing materials. Particularly suitable silica-containing materials are silica sand and silica flour; particularly suitable magnesium silicate-containing materials are slate powder, olivine sand and olivine flour; and a suitable alumina-containing material is calcined bauxite.

Preferably there is used at least 5% by weight of the fine aggregate based on the weight of the hydraulic cement. A wide range of proportions of the fine aggregate may be used but the proportion is usually not more than 100% and preferably not more than 75% by weight of fine aggregate based on the weight of hydraulic cement. Particularly good results are obtained using up to 50% by weight of the aggregate.

By the term 'hydraulic cement' we mean those cements which comprise one or more compounds which are a combination of one or more of the elements calcium, aluminium, silicon, oxygen and/or sulphur and which set and harden by reaction of these compounds with water. This definition will include those cements commonly classed as Portland cements, for example, ordinary Portland cement, rapid hardening and extra-rapid hardening Portland cements, sulphate-resisting Portland cement and other modified Portland cements; those cements commonly known as aluminous, high alumina cements, or calcium aluminate cements; gypsum; and varieties of the foregoing cements containing small quantities of accelerants, retarders, air entraining agents, etc.

We have found that there can be advantage in using a combination of cements, for example a principal cement and 0.2–20% by weight based on the principal cement of a co-cement. The principal and co-cement can comprise any of the hydraulic cements mentioned above.

The water-dispersible polymer which is used in this invention is capable of dispersion in water to produce for example a fine dispersion of polymer particles, a micellised solution, or any other form of solution or apparent solution of the polymer. The polymer is initially selected for its suitability to suitable modify the rheology of the uncured mixture of cement, water and fine aggregate by a test procedure described in our earlier application.

One group of suitable polymers may be further selected by a test procedure described in our earlier patent application in which there is measured the delay in reaching the maximum rate of heat evolution, due to the presence of the polymer, in the reaction between the hydraulic cement and water. A significant delay, from about 0.5 hours to about 20 hours, is indicative of a suitable polymer. This is not an exclusive test however since the essential requirement in a suitable water dispersible polymer is that, in addition to satisfying the rheology test, it will provide a cured cementitious composition of modulus of rupture greater than 20 $MN/m^2$.

Particularly suitable types of water dispersible polymer are alkyl or hydroxyalkyl cellulose ethers, polymers (including copolymers) of acrylamide or methacrylamide, polymers (including copolymers) of ethylene oxide, and polyvinylpyrrolidone.

Particularly suitable alkyl or hydroxyalkyl cellulose ethers are methyl cellulose, hydroxy ethyl cellulose, methylhydroxy ethyl cellulose, ethyl hydroxyethyl cellulose, hydroxypropyl cellulose, hydroxypropyl methyl cellulose and hydroxybutyl methyl cellulose.

Particularly suitable polymers of acrylamide or methacrylamide are polyacrylamide, polymethacrylamide and an acrylamide/methacrylamide copolymer.

Preferably there is used 0.5–2.0 parts by weight of water-dispersible polymer to 100 parts by weight of hydraulic cement.

Preferably there is also used 15–25 parts by weight of water to 100 parts by weight of cement.

In using the terms "homogeneous," "homogenisation," and "homogenisation process" we mean that at least the essential ingredients of the uncured composition, i.e. hydraulic cement, fine aggregate, water dispersible polymer and water, are subjected to a high shear mixing or related process so that the ingredients are very regularly dispersed throughout the composition and that the voidage normally present in uncured cementitious compositions is very substantially reduced. We believe that it was previously unknown to satisfy all of these conditions in a cementitious composition.

Particularly suitable processes for producing such a condition in the uncured composition comprise extrusion and calendering. Preferably the ingredients are first blended and subjected to a first step of high shear mixing and, optionally, a de-aeration proxess whereby gross inhomogeneity is eliminated, to produce a dough. This material is then subjected to a second stage of compaction and dispersion and, optionally, de-aeration in order to complete the homogenisation required in the uncured cementitious composition. Preferably this second stage comprises ram or screw extrusion or calendering processes but other suitable processes include press moulding, injection moulding and expression rolling. The ingredients of this invention may, however, be subjected to any other suitable conditions which produce the desired homogeneous composition.

Preferably the cured and dried cementitious compositions of this invention have a modulus of rupture greater than 30 $MN/m^2$.

A further surprising aspect of the present invention relates to the improved retention in modulus of rupture of the cured and dried cementitious compositions of our earlier application when exposed to the weather, for example under conditions of uptake and subsequent loss of moisture. We have found that the presence of our defined fine aggregate provides an unexpected resistance to any permanent loss in modulus of rupture which otherwise might be experienced under these conditions.

The homogeneous uncured cementitious composition of this invention may be shaped in the form of articles, and thereafter cured and dried to yield the finished articles. The shaping operation may occur during or immediately after homogenisation, for example by extrusion or calendering.

The compositions of this invention may comprise fibre. Such fibre may be in various forms, for example monofilament, roving, or fibrillated sheet.

Suitable fibres include natural or synthetic organic polymers and synthetic inorganic fibres.

Preferably the fibre is present in the composition in a proportion which is not greater than the critical volume fraction of the fibre with respect to the composition. The impact strength of the composition may be thus improved whilst the stress-strain relationship remains substantially unchanged. Suitable fibres which improve the impact strength include nylon and polypropylene.

It may be desired to include in the present compositions a proportion of fibre which has a high tensile strength and which further increases the modulus of rupture beyond the already high limit of proportionality of the stress-strain plot. Suitable such fibres include synthetic inorganic fibres such as glass fibre, carbon fibre ans steel fibre.

The present compositions may also comprise further ingredients, for example polymer latices, pigments, dispersants and any other appropriate ingredient which is known in the art of cementitious compositions.

The invention is illustrated by the following Examples in which parts and percentages are by weight unless otherwise stated:

EXAMPLE 1

This Example illustrates the significant increase in modulus of rupture which is achieved by the presence of an Olivine sand in the matrix of a cured composition of the type described in our earlier application Ser. No. 736,350 filed Oct. 27, 1976.

(a) The following ingredients were mixed using a Hobart food mixer fitted with a planetary motion dough hook; mixing was continued until the material had formed a coherent dough:

|  | Parts by weight |
|---|---|
| Rapid hardening Portland Cement | 100 |
| High alumina cement ("Ciment fondu") | 5 |
| Nylon fibre (20 denier; 10mm long | 0.5 |
| Hydroxypropylmethyl cellulose ("Celacol" HPM 15,000 DS, having a molecular weight defined by a viscosity of 15,000 cp. at 2% concentration in water; "Celacol" is a trade mark of British Celanese Ltd). | 1.6 |
| Water | 18.4 |

(*The hydroxypropylmethyl cellulose was dispersed in the water, i.e. as an 8% solution, at least 24 hours before being added to the cement).

The dough was placed in the barrel of a ram extruder. A vacuum was applied to remove air from the mix until the pressure was less than 50 mm mercury. The material was then extruded through a tubular die of diameter 14 mm. Lengths of the extruded material were cured for 24 hours in a sealed polythene bag at 20° C. and then for 7 days in a fog chamber at 20°–25° C. The samples were then dried for 3 days in an oven at 70° C. and tested in a three-point (centre-point loading) bend test on an Instron tensometer. From the load-deflection curve produced by this test the modulus of rupture was calculated using the Euler-Bernoulli theory of bending.

(b) In a second experiment the ingredients listed above were taken together with 25 parts by weight of an Olivine sand ("Olivine 10" obtained from Production Chemicals Limited, which had a particle size range defined by: at least 98% by weight passed an ASTM 50 sieve (aperture 300 $\mu$m) and 77% was retained by an ASTM 270 sieve (aperture 53 $\mu$m).) and mixed in the same way as before.

The material was placed in the ram extruder, evacuated and extruded; the lengths of extruded material were cured and dried; and the lengths were tested in a three-point bend test as in (a).

(c) In a third experiment the same ingredients were taken as in (a) except that 50 parts by weight of the Olivine sand used in (b) were added. The material was mixed, extruded, cured, dried and tested all as in (a).

The mean modulii of rupture of samples of the materials are shown in the following table:

| Olivine sand content of sample (pts. by wt./100 pts. cement) | Modulus of Rupture ($MN/m^2$) | Density $kg/m^3$ |
|---|---|---|
| (a) 0 | 28.4 | 2.21 × $10^3$ |
| (b) 25 | 35.7 | 2.34 × $10^3$ |
| (c) 50 | 38.3 | 2.39 × $10^3$ |

EXAMPLE 2

This Example illustrates the significant increase in modulus of rupture which is achieved by the presence of a slate powder in the matrix of a cured composition of the type described in our earlier application.

The following ingredients were weighed and mixed in a Hobart food mixer as described in Example 1.

|  | Parts by weight |
| --- | --- |
| Rapid hardening Portland Cement | 100 |
| High alumina cement ("Ciment fondu") | 5 |
| Nylon fibre (20 denier; 10mm long) | 0.5 |
| Hydroxypropylmethyl cellulose ("Celacol" HPM 15,000 DS) | 1.6 *|
| Water | 18.4 * |
| Slate Powder (obtained as "Delafilla" from the Delabole Slate Company; the particle size range was defined by: at least 95% by weight passed a B.S. 200 sieve (aperture 75 μm).) | 25.0 |

(*added as an aqueous solution of the polymer).

The material was extruded, and samples were cured and dried as in Example 1.

The samples were tested in a three-point bend test as previously described. The mean modulus of rupture of the samples was found to be 38.1 MN/m$^2$. The density was found to be 2.16×10$^3$ kg/m$^3$.

EXAMPLE 3

This Example illustrates the significant increase in modulus of rupture which is achieved by the presence of a silica sand.

The following ingredients were mixed in a Hobart food mixer as described in Example 1.

|  | Parts by weight |
| --- | --- |
| Rapid hardening Portland Cement | 100 |
| Hight alumina cement ("Ciment fondu") | 5 |
| Nylon fibre (20 denier, 10mm long) | 0.5 |
| Hydroxypropylmethyl cellulose ("Celacol" HPM 15,000 DS) | 1.6 * |
| Water | 18.4 * |
| Silica sand ("Redhil 65" having a particle size range defined by: at least 95% by weight passed a B.S. 30 sieve (aperture 500 μm) and more than 95% was retained by a B.S. 150 sieve (aperture 104 μm) | 25.0 |
| Water (added separately) | 2.0 |

(*added as an aqueous solution of the polymer)

After extrusion, curing, drying and testing as previously described, the mean modulus of rupture of the product was found to be 33.9 MN/m$^2$. The density was 2.15×10$^3$ kg/m$^3$.

In a second experiment the same ingredients as above were used but the proportion of silica sand ("Redhill 65") was increased from 25 parts to 50 parts by weight, and the proportion of additional water was increased from 2 to 4 parts by weight. After extrusion, curing and drying in the way described above, the mean modulus of rupture was found to be 28.2 MN/m$^2$. The density was found to be 2.13×10$^3$ kg/m$^3$. This latter result indicates that sand up to 50 parts by weight, based on 100 parts of cement, may be used without loss in flexural strength.

EXAMPLE 4

This Example illustrates the significant increase in modulus of rupture which is achieved by the presence of a silica flour.

The following ingredients were weighed and mixed in a Hobart mixer:

|  | Parts by weight |
| --- | --- |
| Rapid hardening Portland Cement | 100 |
| High alumina cement ("Ciment fondu") | 5 |
| Nylon fibre (20 denier, 10mm long) | 0.5 |
| Hydroxypropylmethyl cellulose ("Celacol" HPM 15,000 DS) | 1.6 * |
| Water | 18.4 * |
| Silica Flour (commercially available as "Minusil"; the particle size range was defined by: at least 98% by weight is finer than 5 μm | 25 |
| Water (added separately) | 5 |

(*added as an aqueous solution of the polymer)

The ingredients were extruded, cured, dried and tested as before. The samples were found to have a mean modulus of rupture of 33.5 MN/m$^2$. The density was found to be 2.11×10$^3$ kg/m$^3$.

EXAMPLE 5

When there was used a mixing machine more efficient than the Hobart mixer (used in the previous Examples) it was possible to employ lower proportions of water than have been hitherto described. In these circumstances it was found that the modulus of rupture of the aggregate-free matrix increased and that the presence of certain aggregates further increased the modulus of rupture.

The following ingredients were weighed out:

|  | Parts by weight |
| --- | --- |
| Rapid hardening Portland Cement | 100 |
| High alumina cement ("Ciment fondu") | 5 |
| Nylon fibre (20 denier, 10mm long) | 0.5 |
| Hydroxypropylmethyl cellulose ("Celacol" HPM 15,000 DS) | 1.52 * |
| Water | 17.38 * |

(*The hydroxypropylmethyl cellulose was dispersed in water as an 8% solution at least 24 hours prior to being added to the cement).

The materials were mixed on a Werner-Pfleiderer pug mixer, fitted with "Z"-blades, for approximately 20 minutes until a coherent dough began to form. The material was then placed in the barrel of a ram extruder, the air was evacuated as described in Example 1 and the material was then extruded through a tubular die of diameter 14 mm. Lengths of the material were cured and dried as described previously.

In a second experiment the same ingredients were mixed, together with 25 parts by weight (based on the rapid hardening Portland cement) of silica sand ("Redhill 65"). This material was extruded, cured and dried in the manner already described. In a third experiment a similar proportion of Olivine sand ("Olivine 10") was used.

Samples of these cured and dried materials were tested in a three-point bending test as described in Example 1. The mean modulii of rupture were as follows:

|  | Modulus of Rupture | Density kg/m$^3$ |
|---|---|---|
| Standard | 32.4 MN/m$^2$ | 2.35 × 10$^3$ |
| "Redhill 65" | 35.2 MN/m$^2$ | 2.34 × 10$^3$ |
| "Olivine 10" | 44.5 MN/m$^2$ | 2.37 × 10$^3$ |

EXAMPLE 6

This Example illustrates the significant increase in modulus of rupture which is achieved by the presence of calcined bauxite in the matrix of a cured composition of the type described in our earlier application.

(a) The following ingredients were weighed and mixed in a Werner-Pfleiderer pug mixer fitted with "Z"-blades:

|  | Parts by weight |
|---|---|
| Rapid hardening Portland Cement | 100 |
| High alumina cement ("Ciment fondu") | 5 |
| Nylon fibre (20 denier, 10mm long) | 0.5 |
| Hydroxypropylmethyl cellulose ("Celacol" HPM 15,000 DS) | 1.76 ⎫ * |
| Water | 20.24 ⎭ |
| Calcined Bauxite G5890 (supplied by C.E. Ramsden & Co. Ltd; the particle size range was defined by: 100% passed as ASTM 80 sieve (aperture 180 μm) | 25 |

(*The hydroxypropylmethyl cellulose was dispersed in the water as an 8% solution at least 24 hours prior to being added to the cement).

The materials were mixed for approximately 20 minutes. The composition was then placed in the barrel of a ram extruder, the air was evacuated as in Example 1 and the composition was extruded through a tubular die of diameter 14 mm. Lengths of the extruded material were sealed in a polythene bag for 24 hours to allow them to set and then cured for 7 days in a water fog at 20°-25° C. They were then dried at 20° C. and 50% relative humidity for 2 weeks.

The samples had a mean modulus of rupture of 31.2 MN/m$^2$. In an otherwise similarly made product but not containing calcined bauxite the modulus of rupture was 29.0 MN/m$^2$.

(b) In a further experiment the following ingredients were weighed out and mixed in a Werner-Pfleiderer mixer:

|  | parts by weight |
|---|---|
| Rapid hardening Portland Cement | 100 |
| High alumina cement ("Ciment fondu") | 5 |
| Nylon fibre (20 denier, 10mm long) | 0.5 |
| Hydroxypropylmethyl cellulose ("Celacol" HPM 15,000 DS) | 1.64 ⎫ * |
| Water | 18.86 |
| "Complast" M1** | 2.0 ⎭ |
| Calcined Bauxite G4976 (supplied by C.E. Ramsden & Co. Ltd; the particle size range was defined by: 100% by weight passed an ASTM 100 sieve (aperture 150 μm) | 25 |

(*prepared as in (a).)
(**"Complast" is the trademark of Chemical Building Products Ltd, and "Complast" M1 is a sulphonated melamine formaldehyde condensate which is used as a workability aid or a water-reducing aid).

The ingredients were mixed for approximately 20 minutes and the composition was then placed in the barrel of a ram extruder, the air evacuated and the composition was extruded through a tubular die of diameter 14 mm. Lengths of extruded material were cured and dried, as described in (a) above and tested in a three-point bend test. They were found to have a mean modulus of rupture of 38.8 MN/m$^2$.

EXAMPLE 7

This Example illustrates the use of a polyacrylamide as a water dispersible polymer together with various aggregates.

(a) The following ingredients were weighed out and mixed in a Werner-Pfleiderer pug mixer:

|  | parts by weight |
|---|---|
| Rapid hardening Portland Cement | 100 |
| High alumina cement ("Ciment fondu") | 5 |
| Nylon fibre (20 denier, 10mm long) | 0.5 |
| Polyacrylamide (of molecular weight approximately 13.0 × 10$^6$; "Verisicol" W25) | 1.68 ⎫ * |
| Water | 19.32 ⎭ |

(*"Versicol" is a trademark of Allied Colloids Ltd).
(**The polyacrylamide was dispersed in water as an 8% solution at least 24 hours prior to being added to the cement).

After mixing, the composition was placed in the barrel of a ram extruder, the air was evacuated and the composition was extruded through a tubular die of diameter 14 mm. Lengths of the extruded material were sealed in a polythene bag for 24 hours to allow them to set, cured for 7 days in a water fog at 20°-25° C., then allowed to dry in an atmosphere at 20° C. and 50% relative humidity for 2 weeks. Samples were then tested in a three-point bend test. The mean modulus of rupture was found to be 34.5 MN/m$^2$.

(b) A series of compositions was prepared according to the following table:

|  | A | B | C | D | E | F | G |
|---|---|---|---|---|---|---|---|
| Rapid hardening Portland cement | 100 | 100 | 100 | 100 | 100 | 100 | 100 |
| High alumina cement ("Ciment fondu") | 5 | 5 | 5 | 5 | 5 | 5 | 5 |
| Nylon fibre |  |  |  |  |  |  |  |

| | A | B | C | D | E | F | G |
|---|---|---|---|---|---|---|---|
| (20 denier/10mm) | 0.5 | 0.5 | 0.5 | 0.5 | 0.5 | 0.5 | 0.5 |
| Polyacrylamide ("Versicol" W25) * | | | | | | | |
| Water | 23.0 | 18.4 | 18.4 | 18.4 | 18.4 | 19.32 | 20.24 |
| Slate powder ("Delafilla") | 25.0 | — | — | — | — | — | — |
| Silica sand (Kings Lynn 60) ** | — | 25.0 | — | — | — | — | — |
| Silica sand (Kings Lynn 95) ** | — | — | 25.0 | — | — | — | — |
| Silica sand 20/90 (Tilcon) | — | — | — | 25.0 | — | — | — |
| Silica sand 40/90 (Tilcon) | — | — | — | — | 25.0 | — | — |
| Silica sand ("Redhill" R110) *** | — | — | — | — | — | 25.0 | — |
| Olivine 10 | — | — | — | — | — | — | 25.0 |

(*The polyacrylamide was dispersed in water as an 8% by weight solution at least 24 hours before use).
(**Supplied by British Industrial Sands).

The particle size range of each aggregate was defined as follows:

Kings Lynn 60—98% passed a B.S. 30 sieve (aperture 500 μm) and 98% was retained by a B.S. 150 sieve (aperture 104 μm).

Kings Lynn 95—100% passed a B.S. 30 sieve (aperture 500 μm) and 98% was retained by a B.S. 200 sieve (aperture 76 μm).

Silica sand 20/90—100% passed a B.S. 16 sieve (aperture 1 mm), 100% was retained by a B.S. 200 sieve (aperture 75 μm)

Silica sand 40/90—100% passed a B.S. 25 sieve (aperture 600 μm), and 100% was retained by a B.S. 200 sieve (aperture 75 μm)

Redhill 110—100% passed a B.S. 30 sieve (aperture 500 μm) and 90% was retained by a B.S. 200 sieve (aperture 75 μm).

In each case the materials were mixed in a Werner-Pfleiderer pug mixer. After mixing, the composition was charged to the ram extruder as described in (a) above. The material was extruded through the same 14 mm diameter tube die as in (a) above and allowed to set, cure and dry as described in (a). Samples of each composition were then tested in a three-point bend test and the mean modulus of rupture was calculated. The modulii of rupture, with reference to the above table, were found to be:

| A | B | C | D | E | F | G | |
|---|---|---|---|---|---|---|---|
| 41.7 | 35.0 | 40.5 | 36.7 | 34.2 | 38.4 | 35.9 | (MN/m$^2$) |

EXAMPLE 8

This Example illustrates the advantage of the presence of certain aggregates in the matrix of the high strength cured compositions of our earlier application, since there is then less loss in strength (modulus of rupture) on exposure to natural weather conditions.

(a) The following ingredients were taken:

| | parts by weight |
|---|---|
| Rapid hardening Portland Cement | 100 |
| "Ciment fondu" | 5 |
| Hydroxypropylmethyl cellulose ("Celacol" HPM 15,000 DS) | added as 1.48 |
| Water | an 8% aqueous solution 17.02 |
| Nylon fibre (20 denier/10mm long) | 0.5 | and were mixed in a Werner-Pfleiderer pug mixer fitted with "Z"-blades until a coherent dough began to form. The mixed material was then placed in the barrel of a ram extruder and the air was evacuated under a vacuum of 740–750 mm mercury. The material was then extruded through a tubular die of diameter 14 mm. Lengths of the extruded material were placed in sealed polythene bags to set for 24 hours. When set they were placed in a water fog at 25° C. for 7 days and subsequently dried at 20° C. and 50% relative humidity for 14 days.

(b) In a second experiment the same ingredients as above were taken in the same proportions, but 25 parts by weight of an olivine sand ("Olivine 10" from Production Chemicals Ltd) were added. The ingredients were mixed and extruded in the same way as before, and subsequently cured and dried under the same conditions.

The mean modulii of rupture of materials from each experiment were as follows:
 (a) No aggregate: 32.5 MN/m$^2$
 (b) With aggregate: 35.0 MN/m$^2$ Samples of materials from (a) and (b) were placed in outdoor racks and were exposed to natural weathering conditions for 1 year. They were then tested in the three-point bend test and their mean modulus of rupture was calculated. The results were as follows:
 (a) No aggregate: 24.2 MN/m$^2$
 (b) With aggregate: 31.9 MN/m$^2$

EXAMPLE 9

This Example illustrates the advantage of the presence of certain aggregates in the matrix of the high strength cured compositions of our earlier application since the aggregate-containing compositions show improved durability and resistance to loss in strength when subjected to repeated cycles of wetting and drying.

The following mixes were prepared:

|  | (a) | (b) | (c) |
|---|---|---|---|
| Rapid hardening Portland cement | 100 | 100 | 100 |
| "Ciment fondu" | 5 | 5 | 5 |
| Hydroxypropylmethyl cellulose ("Celacol" 15,000 DS) * | 1.6 | 1.68 | 1.48 |
| Water | 18.4 | 19.32 | 17.02 |
| Nylon fibre (20 denier/10mm) | 0.5 | 0.5 | 0.5 |
| "Complast" M1 ("superplasticiser") | 2 | 2 | 0 |
| Olivine flour** | 25 | — | — |
| Slate flour ("Delafilla") | — | 25 | — |
| Silica sand (Kings Lynn 60) | — | — | 25 |

(*added as 8% aqueous solution)
(**The particle size of olivine flour was defined by: 95% passed a B.S. 200 sieve (aperture 75 μm).)

The ingredients were mixed as described in previous Examples in a Werner-Pfleiderer pug mixer. The mixed material was then placed in the barrel of a ram extruder and the air was evacuated under a vacuum of 740–750 mm mercury. The material was then extruded through a tubular die of diameter 14 mm. The extruded material was placed in sealed polythene bags to set for 24 hours and when set samples were placed in a water fog and cured for 7 days at 25° C. They were then dried for 2 weeks at 20° C. at relative humidity 50% and finally tested in a three-point bend test. The main modulii of rupture were calculated.

Samples were then exposed to a repeated cycle of 6 hours soaking in water at 20° C. followed by 18 hours drying at 20° C. A proportion of the samples were tested in flexure after 10 cycles and the remainder were tested in flexure after 20 cycles. The mean modulii of rupture were calculated. The results obtained are set out in the following table.

|  | Aggregate | M.O.R. (MN/m²) Before cycling | After 10 cycles | After 20 cycles |
|---|---|---|---|---|
| (a) | Olivine flour | 30.5 | 30.4 | 31.3 |
| (b) | Slate flour ("Delafilla") | 40.1 | 35.8 | 37.1 |
| (c) | Silica sand (Kings Lynn 60) | 30.6 | 32.4 | 30.4 |

By comparison the standard material described in Example 8 had declined from 32.5 MN/m² before cycling to 29.1 MN/m² even after 4 cycles.

EXAMPLE 10

This Example shows that high temperature curing of the uncured composition may be used without losing the beneficial effect of the aggregate. Mixes were prepared according to the following table:

|  | (a) | (b) | (c) | (d) | (e) | (f) | (g) | (h) |
|---|---|---|---|---|---|---|---|---|
| R HPC[1] | 100 | 100 | 100 | 100 | 105 | 105 | 105 | 105 |
| "Ciment fondu" | 5 | 5 | 5 | 5 | — | — | — | — |
| HPMC[2] [3] | 1.48 | 1.48 | 1.76 | 1.48 | 1.48 | 1.48 | 1.80 | 1.48 |
| Water | 17.02 | 17.02 | 20.24 | 17.02 | 17.02 | 17.02 | 20.70 | 17.02 |
| Nylon fibre[4] | 0.5 | 0.5 | 0.5 | 0.5 | 0.5 | 0.5 | 0.5 | 0.5 |
| Olivine 10 | — | 25 | — | — | — | 25 | — | — |
| Slate powder ("Delafilla") | — | — | 25 | — | — | — | 25 | — |
| Silica sand ("Redhill" 65) | — | — | — | 25 | — | — | — | 25 |

[1] Rapid hardening Portland cement
[2] Hydroxypropylmethyl cellulose: "Celacol" HPM 15,000 DS
[3] added as an 8% aqueous solution
[4] 20 denier, 10mm length After mixing in a Werner-Pfleiderer pug mixer and extrusion as described in the previous Examples, the samples were treated in various ways. One group was placed in sealed polythene bags for 24 hours and when set placed in a water fog at 25° C. for 7 days. A second group was, immediately after extrusion, placed in a water fog at 70° C. for 6 hours, while a third group was, immediately after extrusion, placed in the 70° C. water fog for 24 hours. All three groups were subsequently dried for 2 weeks at 20° C. and relative humidity of 50% before being tested in flexure in a three-point bend test. The mean modulus of rupture of each set of samples was calculated. The results are given in the following table:

| Sample | Aggregate | M.O.R. in MN/m² after fog curing | | |
|---|---|---|---|---|
| | | 7 days at 25° C. | 6 hrs at 70° C. | 24 hrs at 70° C. |
| (a) with co-cement | — | 29.0 | 31.7 | 28.0 |
| (b) with co-cement | Olivine | 30.8 | 32.6 | 32.6 |
| (c) with co-cement | Slate | 36.1 | 32.7 | 36.9 |
| (d) with co-cement | Silica | 30.9 | 33.8 | 31.5 |
| (e) without co-cement | — | 28.0 | 23.9 | 24.8 |
| (f) without co-cement | Olivine | 33.4 | 28.6 | 31.4 |
| (g) without co-cement | Slate | 43.1 | 31.3 | 38.6 |
| (h) without co-cement | Silica | 33.6 | 30.1 | 31.7 |

We claim:
1. A homogeneous uncured cementitious composition which comprises the following initial ingredients:
 (a) a hydraulic cement selected from the group consisting of cements which comprise compounds of calcium, aluminum, silicon, oxygen and/or sulfur which set and harden by reaction with water,
 (b) water,
 (c) a water-dispersible polymer, and
 (d) a fine aggregate of which 75% by weight passes a sieve of aperture 1 mm;
wherein

(i) the ratio of water to hydraulic cement is in the range 10–28 parts by weight of water to 100 parts hydraulic cement;

(ii) the water-dispersible polymer is selected with reference to the hydraulic cement and to the selected proportions of water, cement and fine aggregate for its suitability to facilitate homogenization and to yield on homogenization a product which can be shaped under pressure and which is shape-retaining;

(iii) the ratio of water-dispersible polymer to hydraulic cement is in the range 0.1–3.0 parts by weight of water-dispersible polymer to 100 parts by weight of hydraulic cement; and (iv) the amount of fine aggregate (d) is 5% to 75% by weight based on the weight of hydraulic cement;

and wherein the ingredients (a), (b), (c) and (d) have been jointly subjected to a homogenization process of dispersion and homogenization so that they are regularly dispersed throughout the composition such that on curing and drying, the homogeneous uncured composition yields a cured, dried cementitious material having a modulus of rupture greater than 20 $MN/m^2$.

2. A composition according to claim 1 wherein 100% of the fine aggregate passes a sieve of aperture 1 mm.

3. A composition according to claim 1 wherein the major proportion of the fine aggregate has a particle diameter of greater than 1 $\mu m$.

4. A composition according to claim 1 wherein there is present up to 75% of fine aggregate by weight based on the weight of hydraulic cement.

5. A composition according to claim 1 wherein the fine aggregate is selected from a silica-containing material, a magnesium silicate-containing material or an alumina-containing material.

6. A composition according to claim 1 wherein the fine aggregate is selected from silica sand, silica flour, slate powder, olivine sand, olivine flour, or calcined bauxite.

7. A composition according to claim 1 wherein the water dispersible polymer is selected from alkyl and hydroxyalkyl cellulose ethers, homopolymers and copolymers of acrylamide or methacrylamide, homopolymers and copolymers of ethylene oxide, and polyvinylpyrrolidone.

8. A composition according to claim 1 wherein the water-dispersible polymer is selected from methyl cellulose, hydroxy ethyl cellulose, methylhydroxyethyl cellulose, ethyl hydroxyethyl cellulose, hydroxy-propyl cellulose, hydroxypropyl methyl cellulose and hydroxybutyl methyl cellulose.

9. A composition according to claim 1 which comprises a fibre other than an inorganic mineral fibre.

10. A composition according to claim 9 wherein the fibre is of nylon or polypropylene.

11. A composition according to claim 9 wherein the fibre is glass fibre.

12. A method of preparing a homogeneous uncured cementitious composition which comprises the following initial ingredients:

(a) a hydraulic cement selected from the group consisting of cements which comprise compounds of calcium, aluminum, silicon, oxygen and/or sulfur which set and harden by reaction with water, (b) water, (c) a water-dispersible polymer, and (d) a fine aggregate of which 75% by weight passes a sieve of aperture 1 mm;

wherein (i) the ratio of water to hydraulic cement is in the range 10–28 parts by weight of water to 100 parts hydraulic cement;

(ii) the water-dispersible polymer is selected with reference to the hydraulic cement and to the selected proportions of water, cement and fine aggregate for its suitability to facilitate homogenization and to yield on homogenization a product which can be shaped under pressure and which is shape-retaining;

(iii) the ratio of water-dispersible polymer to hydraulic cement is in the range 0.1–3.0 parts by weight of water-dispersible polymer to 100 parts by weight of hydraulic cement; and (iv) the amount of fine aggregate (d) is 5% to 75% by weight based on the weight of hydraulic cement;

and wherein the ingredients (a), (b), (c) and (d) have been jointly subjected to a homogenization process of dispersion and homogenization so that they are regularly dispersed throughout the composition such that on curing and drying, the homogeneous uncured composition yields a cured, dried cementitious material having a modulus of rupture greater than 20 $MN/m^2$ wherein the ingredient (a), (b), (c), and (d) are jointly subjected to a homogenisation process comprising a high shear mixing process.

13. A cured and dried cementitious composition comprising cured hydraulic cement, a fine aggregate and a water dispersible polymer which has a modulus of rupture greater then 20 $MN/m^2$.

14. A cured and dried cementitious composition according to claim 13 which also comprises a fibre in a proportion not greater than the critical volume of that fibre with respect to the composition.

15. A shaped article which comprises a cured and dried cementitious composition according to claim 13.

16. A homogeneous uncured cementitious composition as set forth in claim 1 wherein the ingredients (a), (b), (c) and (d) have been jointly shaped.

17. A method as set forth in claim 12 wherein the high shear mixing process comprises an extrusion or calendering process.

18. A method as set forth in claim 12 in which the high shear mixing process is followed by an extrusion or calendering process.

* * * * *